United States Patent
Morales-Garza

(10) Patent No.: US 11,129,011 B2
(45) Date of Patent: Sep. 21, 2021

(54) SYSTEM AND METHOD TO DETECT AND REPORT TO THE AUTHORITIES HIGH LEVEL SOUNDS THAT INFRINGE THE LAW

(71) Applicant: Fernando Morales-Garza, Rancho Viejo, TX (US)

(72) Inventor: Fernando Morales-Garza, Rancho Viejo, TX (US)

(73) Assignee: PROCESS INTEGRATION SYSTEM INC., Spring, TX (US)

( * ) Notice: Subject to any disclaimer, the term of this patent is extended or adjusted under 35 U.S.C. 154(b) by 0 days.

(21) Appl. No.: 17/112,800

(22) Filed: Dec. 4, 2020

(65) Prior Publication Data

US 2021/0204109 A1 Jul. 1, 2021

Related U.S. Application Data

(60) Provisional application No. 62/974,861, filed on Dec. 26, 2019.

(51) Int. Cl.
*H04W 4/90* (2018.01)
*G10L 25/51* (2013.01)

(52) U.S. Cl.
CPC ............ *H04W 4/90* (2018.02); *G10L 25/51* (2013.01)

(58) Field of Classification Search
CPC .......... H04W 4/90; G10L 25/51; G10L 25/00
See application file for complete search history.

(56) References Cited

U.S. PATENT DOCUMENTS

| | | | |
|---|---|---|---|
| 2017/0242655 A1* | 8/2017 | Jarvis | H04S 7/303 |
| 2019/0214019 A1* | 7/2019 | White | H04R 1/326 |
| 2020/0015025 A1* | 1/2020 | Goldstein | G01H 3/14 |

* cited by examiner

*Primary Examiner* — Marisol Figueroa

(57) ABSTRACT

A smart cellphone application is used as sound pressure level meter for determining if ambient noise infringes the legal limit, and sends evidence to prove the infringement to the law enforcement agency. The application play in the speaker at least one reference burst tone, and use Fast Fourier Transform (FFT) to achieve the mentioned functionality.

11 Claims, 5 Drawing Sheets

SYSTEM AND METHOD TO DETECT AND REPORT TO THE AUTHORITIES HIGH LEVEL SOUNDS THAT INFRINGE THE LAW

BACKGROUND OF THE INVENTION

The U.S. Pat. No. 4,257,273 by Knowd of Mar. 24, 1981 title: Sound pressure level meter, describes a sound pressure level meter adapted for use in monitoring noise levels, particularly for use by law enforcement agencies wherein the device includes means for providing a logarithmic indication of the root mean square value of ambient sound pressure levels and wherein means are provided for holding and displaying a maximum sound pressure level detected over a given period of time and for providing an alarm when a detected level exceeds a predetermined threshold level.

While many smart cellphone applications perform as sound pressure level meters as described by Knowd, this applications in the hands of civilians, are for the law enforcement agencies useless because not produce any legal evidence that can be presented to a judge to rule over a past infringement. Evidence like time, location, proves of calibration, captured audio file, and an algorithm to avoid tamper proof.

BRIEF SUMMARY OF THE INVENTION

This invention relates to devices for detecting sound pressure levels such as may be useful for monitoring noise levels in neighborhoods environments, particularly when neighbors use their cellphones to detect and report unlawful noise levels to the law enforcement agencies.

In contrast to such prior art devices, the device of the present invention provides significantly improved capabilities, making it particularly desirable in civilian sound pressure level monitoring.

The device or cellphone sends a digital audio file as evidence of sound pressure level infringement which includes burst tones used as reference to determine the infringement.

In the cellphone application of the present invention, utilizes its means to locate the cellphone, actual time, date and also the speaker to generate reference tones to determine if the maximum sound pressure level detected infringe the law.

Also the cellphone application sends time, date, latitude and longitude and an audio file to the law enforcement agency as evidence of the event.

To detect of an ambient sound pressure, the present invention utilize an application that start recording the audio present at the cellphone microphone and simultaneous the cellphone speaker generates burst tones synchronized with future slots of Fast Fourier Transform (FFT) size used to evaluate the ambient sound, that also include the burst tones.

The present invention using the recorded ambient audio that contains a burst tone signals as reference to determine law breach, performing many FFTs to analyze the entire recorded audio sample by sample, until a burst tone (of length less that the FFT size), produce maximum energy. The burst tone could contain more than one frequency to increase detection performance. As well the recorded audio could contain many burst tones to increase accuracy.

The ambient sound obviously is present in all FFT's results so more than one simultaneous tone could be added to better detect the sync and reference signals.

A careful echo and speaker inertia analysis should be consider to determine burst tones time separation, to be able to use the tones as reference to determine if the ambient sound captured by the cell phone, generate enough evidence of infringement.

To determine if an infraction occurred, the cell phone send its manufacture model, phone number, GPS location, date/time, FFT detected data and the recorded file to a evaluating server, which could store and send the link to retrieve the evidence of infringement to the law enforcement agency.

The mentioned detection algorithm could be performed at the user device or at the server or by both.

DETAILED DESCRIPTION OF THE INVENTION

Figure 1:
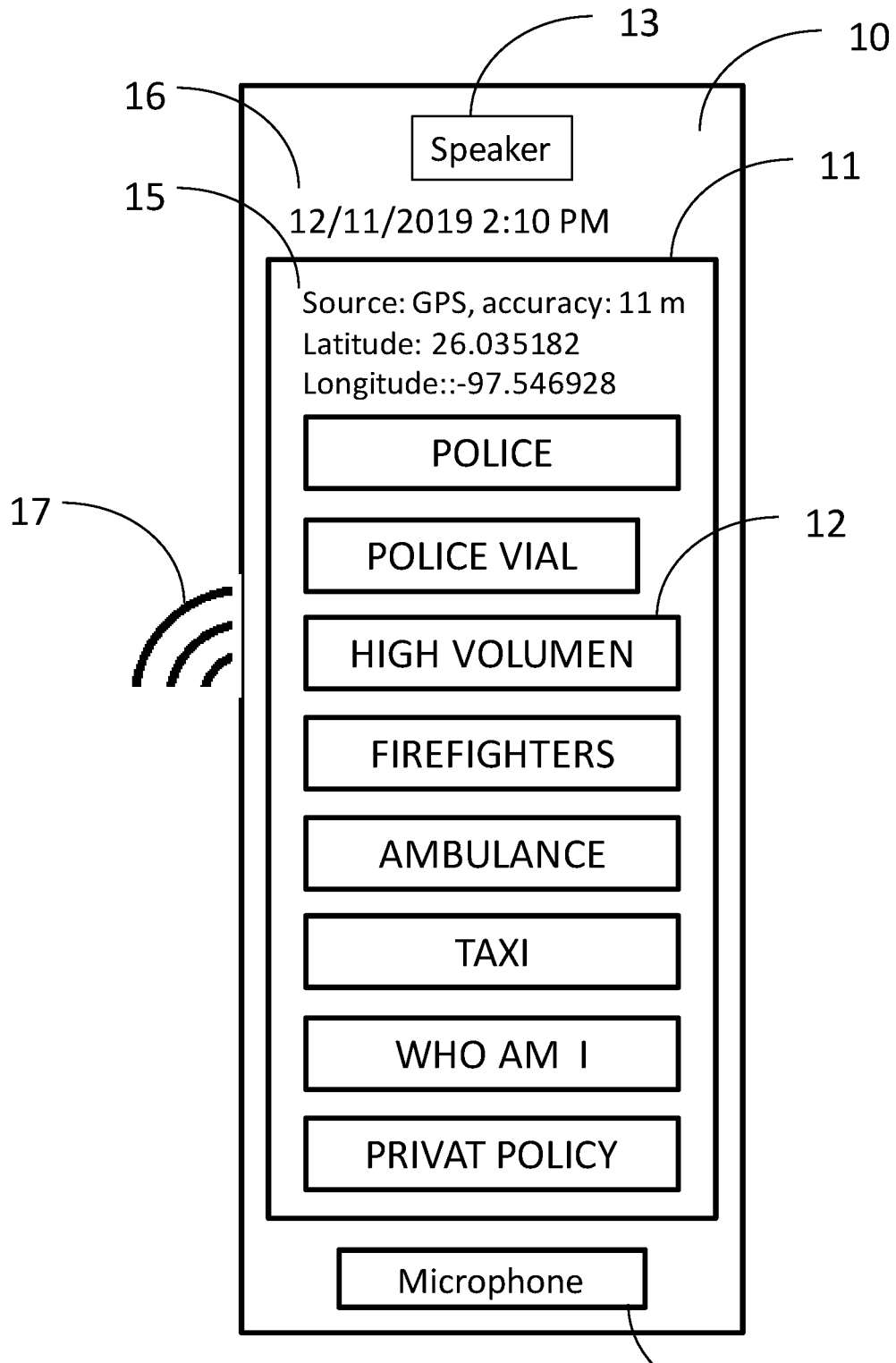
FIG. 1 is a view of one embodiment of the device of the present invention.

A preferred configuration for the sound pressure monitoring device of the present invention is shown in FIG. 1. As there shown, the cellphone 10 includes an application 11 that when click the High Volume button 12 use the cellphone speaker 13 to generate tones for sync and reference preferably not all the time, so that the cellphone microphone 14 can capture and record both sounds from the ambient, to determine if the sound pressure during the times without the mentioned tones is above the legal limited, to do so the application 11 using the cellphone circuits to reads the GPS 15 as well as the date-time 16 and sends data through the communication circuits 17, the mentioned data could include Fast Fourier Transform results as well as the captured sound file.

Figure 2:
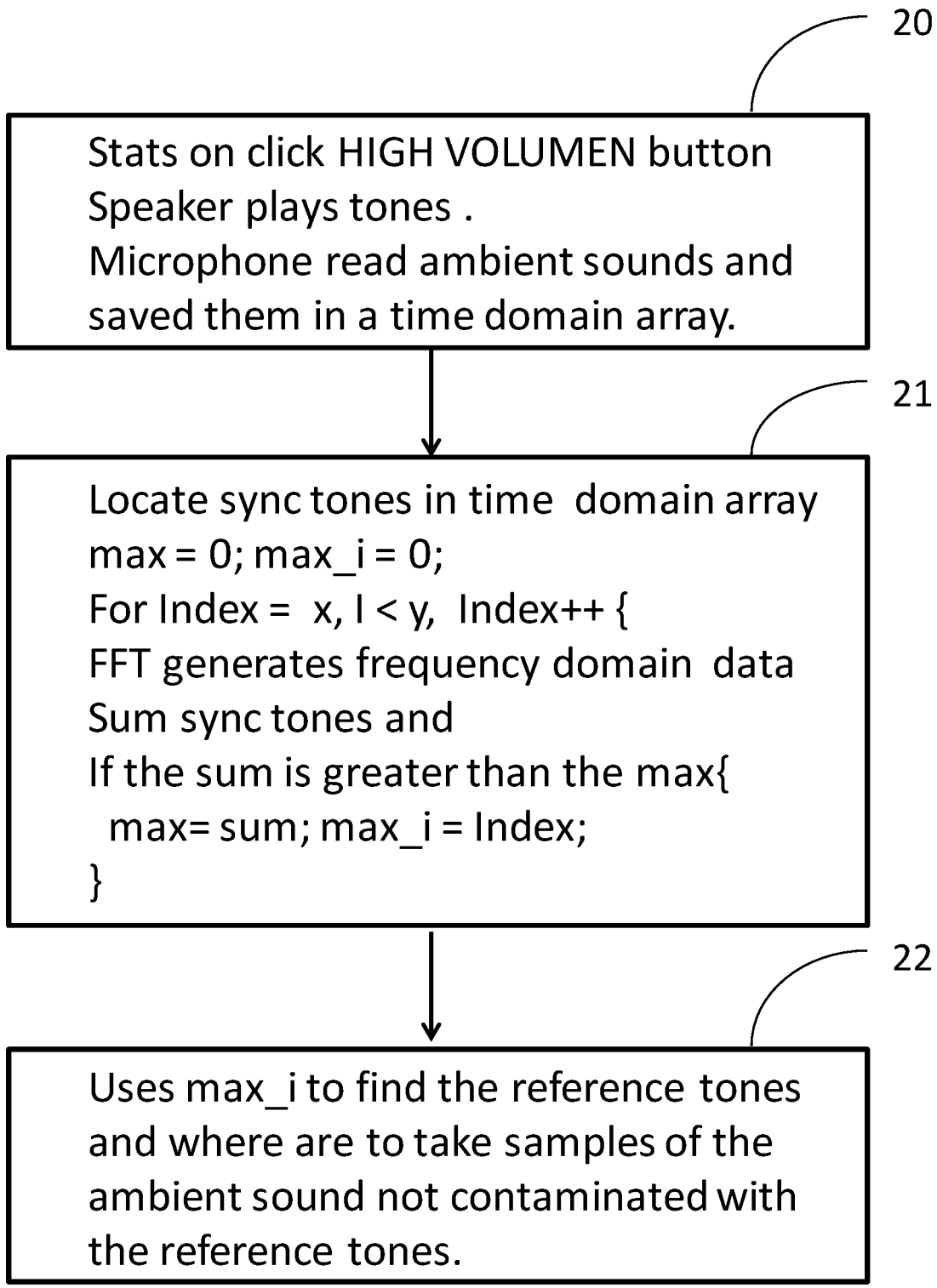
FIG. 2 is a block diagram of a program utilized in a preferred embodiment.

The functions of these various components are best described in conjunction with the block diagram shown in FIG. 2. As is there shown, the first process block 20 begins when the cellphone 10 use the application 11 to allow click the High Volume button 12 to play to the speaker 13 an output array which contains a periodic analog representations of the burst tones, on click the button 12 also the application 11 starts loading in an input array with the periodic incoming samples of the microphone 14, At finish playing the output array the process block 21 starts from the first position of the incoming samples searching for a sync tones, this tones could be in an undetermined location due of the computing speed of the cellphone or due to tasks performed by the cellphone at that moment.

The process block 21 on FIG. 2 could locate the mentioned start point by repeating the detection algorithm for all possible start points, taken the better one at the end of the process. The sync detection process starting with index=x. To save time, x is not zero, is the initial expected position to begin the search. Also to save time the search for sync tones should end in a position after which is not possible to find thee sync tones. The mentioned detection algorithm could be an FFT, which could add the magnitude of more than one tone to evaluate; such tones could be of frequencies randomly generated to pass tamper proof test.

The FFT algorithm generates the frequency domain array from a time domain array created sampling the microphone 14.

Adding the sync tones magnitude from the frequency domain array in the case that more than one was utilized, and saved it in max with the interaction number max_i, if the magnitude is greater that the obtained on the previous interaction, so that at end of the loop the max magnitude and position of the maximum max_i is found.

The process block 22 on FIG. 2 uses the array location max_i of the sync tones to find the reference tones frequencies and where are the locations to take samples of the ambient sound not contaminated with the reference tones.

The process block 22 on FIG. 2 searches bin by bin in the time and frequency domain arrays to found the maximum magnitude of the ambient sound detected by the microphone of the cellphone, preferably during a time without tones contamination. This process could improve results accuracy by repeating the technique over a larger period of time.

Figure 3:
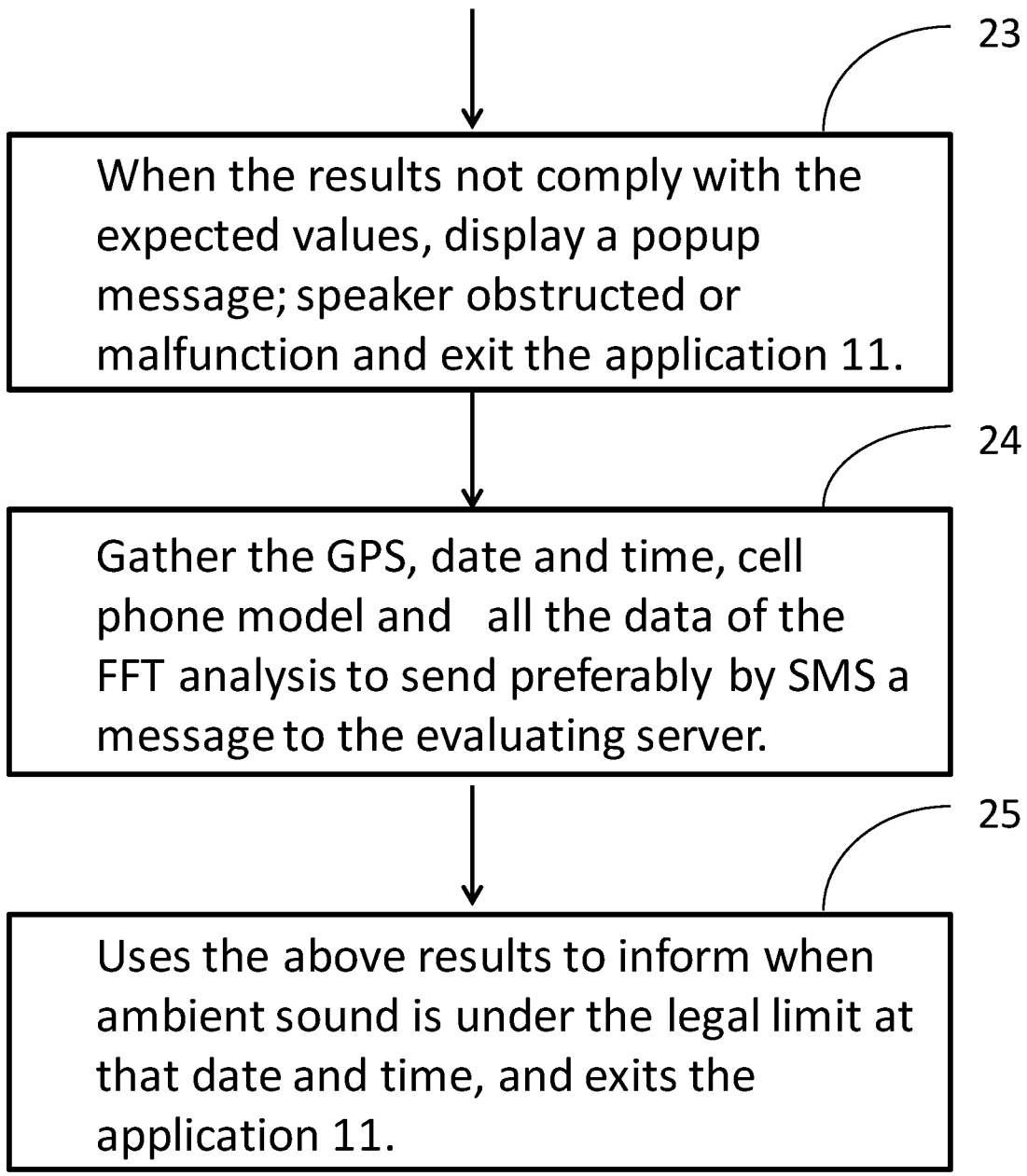
FIG. 3 is a continuation of the block diagram of the FIG. 2

The process block 23 on FIG. 3 could determine if the results and their difference not comply with the expected values, if so display a popup message; speaker obstructed or malfunction and exit the application 11.

The process blocks 24 on FIG. 3 gather the precise location of the cellphone at the time of capturing the ambient sound, cellphone model, and all the data of the FFT analysis to create and send preferably by SMS a message to the evaluating server.

The process block 25 on FIG. 3 could use the results obtained in the process 24 to determine if the ambient sound is under the legal limit at that date and time, if so display a popup message; ambient sound at that location is legal, and exits the application 11.

Figure 4:
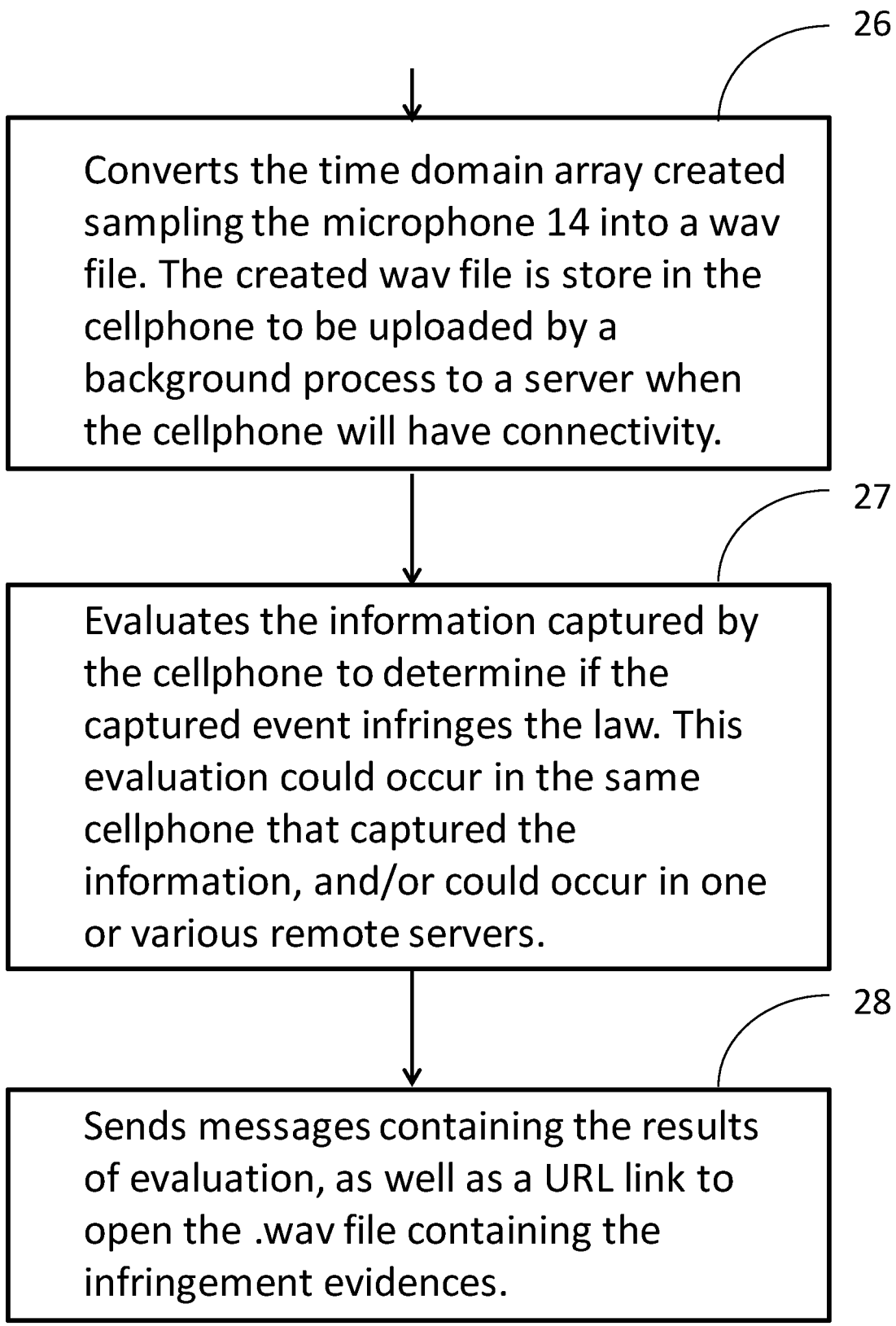
FIG. 4 is a continuation of the block diagram of the FIG. 3

The process block 26 on FIG. 4 converts the time domain array created sampling the microphone 14 into a way file. The created way file is store in the cellphone to be uploaded by a background process to a server when the cellphone will have connectivity.

The process block 27 on FIG. 4 evaluates the information captured by the cellphone to determine if the captured event infringes the law. This evaluation could occur in the same cellphone that captured the information, or could occur in one or various remote servers. The evaluation process could serve one or multiple law enforcement agencies.

The process block 28 on FIG. 4 sends messages containing the results of evaluation, as well as a URL link to open the .wav file containing the infringement evidences. The mentioned messages could be sent by email, SMS, or any other communication platforms. The name of the file could be the sender's cellphone number plus date and time of the event, in a way that the file be tamper proof.

Sending the cellphone model number within the information could improve accuracy or allow rejection of the information from some cellphone models, also perform the same process at application 11 FIG. 1 installation or at random times could help the evaluation process 27 FIG. 4 and improves with that, what results will be tamper proof.

Figure 5:
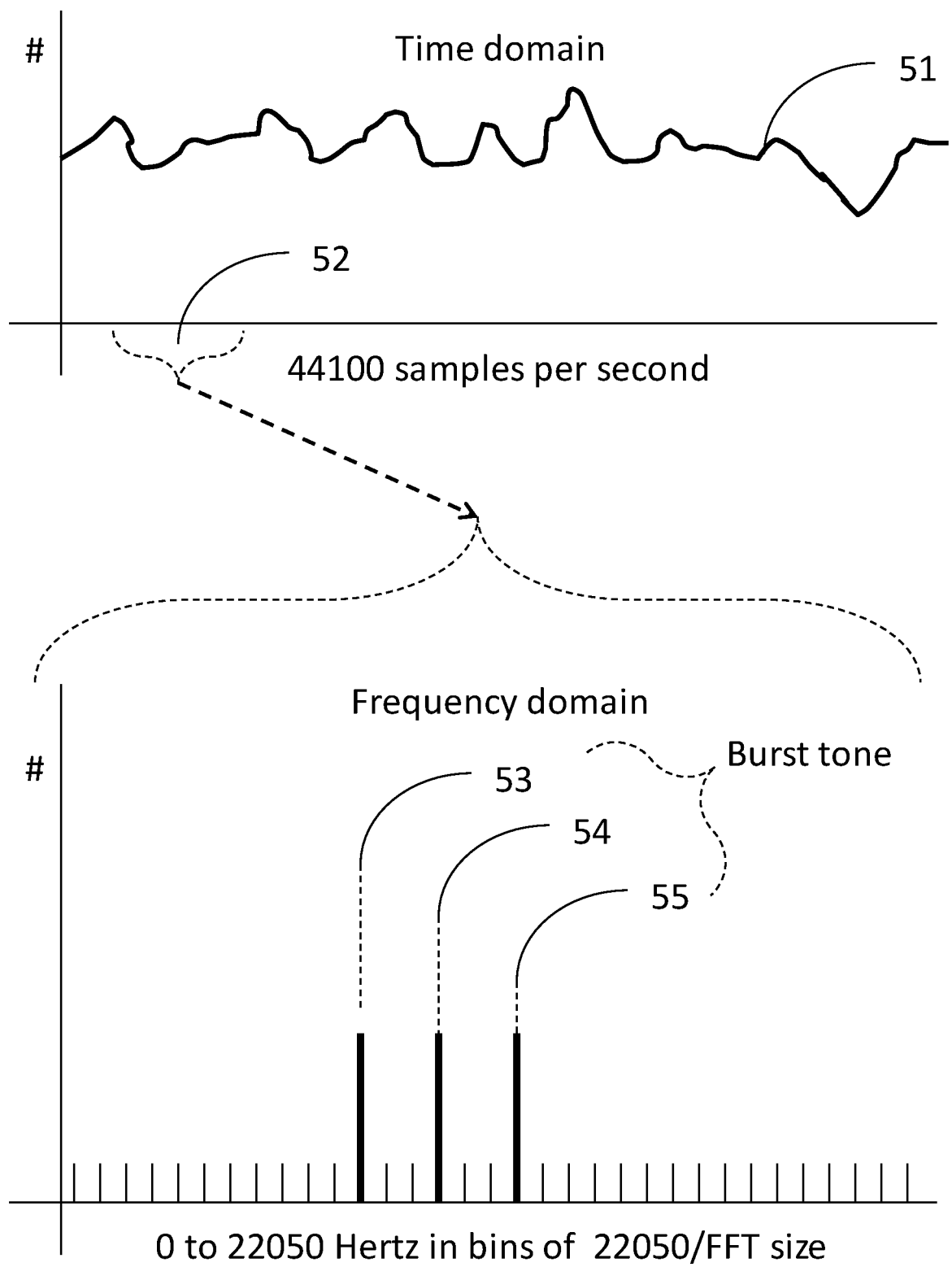
FIG. 5 shows two graphics to teach how to find the sync burst tone.

FIG. 5 Shows a time domain graph in which line 51 represent the numeric ambient sound values captured by the microphone circuit, on each of the 44,100 samples per second realized. Under that graph is another graph in which lines 53, 54, and 55 represent the amplitude of three frequencies that together form the burst tone used to sync the reference burst tones. The number of samples in the interval indicated by 52 is equal to the FFT size. The sync burst time should last less than the time lapsed by the samples required by the FFT. So to find the burst tone location the interval indicated by 52 should shift to the right one or few samples at a time and calculate again and again one FFT until the end of the expected number of sample that should include the burst tone.

The initial position of the interval 52 that produced the maximum sync burst tone amplitude should be used to locate the positions of the reference burst tones, which should be longer than the time lapsed by the number of samples of the FFT used, to guaranty that a full FFT read the tone reference.

To avoid the presence of reference tones, at the time to evaluate the ambient sound level, the time between them must be large and the number of them too, to obtain a good average of all of them as well as a good average of all the ambient sound level samples, which should been taken before each reference burst tone appears.

The frequencies indicated by 53, 54 and 55 could be set by random numbers generated each time that the HIGH VOLUME button is clicked, to improve the evidence worth when more reports are made of the same incident. The message send to the server must contain those random numbers, to properly compare the results when needed.

The preferred environment aim to process the thousands of FFTs at the audio collection device, to avoid the cost increase at the server or central computer, never the less could be less costly device to just capture the ambient sound with just reference tones, allowing incorporating the functionality in small multipurpose devices, like a keychain or car key or all of that plus an alarm button to call police.

The invention described above could be implemented in different way by any skill person in the art, after reading the present specifications, for that reason the claims should be broad, to cover any obvious attempt to patent a similar system or method.

Having thus described the present invention, what is claimed is:

1. In a device adapted to provide evidence to law enforcement agency of unlawful sound pressure levels including:
   a— speaker for playing burst tones generated by the device at time intervals to allow the microphone of the same device to capture ambient sounds with and without the burst tones to be used as amplitude reference;
   b— microphone circuit capable for converting sound into numeric amplitude values;
   c— memory circuit to store numeric amplitude values;
   d— micro-computer capable to analyze in the stored amplitude values, the amplitude of the burst frequency in the time intervals with and without burst tones, to subtract from amplitude of the burst tones, the amplitude of same frequency of burst tones of the interval without burst tones, to determine the reference amplitude; wherein the reference amplitude is used as reference to determine the sound pressure infringement;
   e— location circuit, to find the location information of the device;
   f— clock circuit, to find the time and date information when the device captured an incident that infringes the law; and
   g— communication module to share the evaluation and captured of the evidence of sound pressure infringement, including location information and time of the same.

2. A device according to claim 1, wherein said speaker is any component capable to produce sounds.

3. A device according to claim 1, wherein said Micro-computer is capable of running Fast Fourier Transform or an algorithm to convert the time domain magnitudes to a frequency domain magnitudes.

4. A device according to claim 1, wherein said location circuit utilizes the Global Positioning System to place the incident.

5. A device according to claim 1, wherein said time circuit utilizes the real time clock of the device.

6. A device according to claim 1, wherein said communication module utilizes any communication protocol that could be implemented on said device.

7. A device according to claim 1, wherein said device is a cellphone, tablet or any other smart mobile device.

8. Method to provide evidence to law enforcement agency of unlawful sound pressure levels that perform the following actions:
   a— playing to the ambient burst tones generated by the device at time intervals that allow to be used as amplitude reference of the intervals without tones;
   b— converting ambient sounds into numeric amplitude values indicative thereof;
   c— storing ambient sounds amplitude values;
   d— communicating the evaluation and captured of the evidence of sound pressure infringement, including location information and time of the same to a server and/or directly to the law enforcement agency; and
   e— converting sound amplitude values into frequency amplitude values; and
   f— analyze in the stored audio values, the amplitude of the burst frequency in the time intervals with and without burst tones, to subtract from amplitude of the burst tones, the amplitude of same frequency of burst tones of the interval without burst tones, to determine the reference amplitude; wherein the reference amplitude is used as reference to determine the sound pressure infringement.

9. The method according to claim 8, wherein said activity to convert sound amplitude values into frequency amplitude values is performed by a Fast Fourier Transform or FFT algorithm.

10. The method according to claim 8, wherein said communicating activity utilize any communication protocol.

11. The method according to claim 8, wherein said method is performed in a cellphone, tablet or any other smart mobile device.

* * * * *